US012608233B2

(12) United States Patent (10) Patent No.: US 12,608,233 B2
Martin et al. (45) Date of Patent: Apr. 21, 2026

(54) SYSTEM AND METHOD FOR RECOMMENDING COMPUTING RESOURCES

(71) Applicant: Advanced Micro Devices, Inc., Santa Clara, CA (US)

(72) Inventors: Gabriel Martin, Quintana de la Sirena (ES); Max Alt, San Francisco, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 553 days.

(21) Appl. No.: 18/016,982

(22) PCT Filed: Jul. 20, 2021

(86) PCT No.: PCT/US2021/042439
§ 371 (c)(1),
(2) Date: Jan. 19, 2023

(87) PCT Pub. No.: WO2022/020395
PCT Pub. Date: Jan. 27, 2022

(65) Prior Publication Data
US 2023/0281051 A1 Sep. 7, 2023

Related U.S. Application Data

(60) Provisional application No. 63/054,458, filed on Jul. 21, 2020.

(51) Int. Cl.
*G06F 9/46* (2006.01)
*G06F 9/50* (2006.01)

(52) U.S. Cl.
CPC .......... *G06F 9/5038* (2013.01); *G06F 9/5072* (2013.01); *G06F 2209/5019* (2013.01)

(58) Field of Classification Search
CPC ................. G06F 9/5038; G06F 9/5072; G06F 2209/5019
See application file for complete search history.

(56) References Cited

U.S. PATENT DOCUMENTS 10,841,236 B1 * 11/2020 Jin .......................... H04L 41/149
2018/0113742 A1 * 4/2018 Chung .................. G06F 9/4881
(Continued)

FOREIGN PATENT DOCUMENTS

CN 104077212 A * 10/2014
CN 105975345 B * 3/2019 ........... G06F 9/5044

OTHER PUBLICATIONS

Taghavi et al., Compute Job Memory Recommnder System Using Machine Learning, ACM, Aug. 2016, 8 pages.*
(Continued)

*Primary Examiner* — Diem K Cao
(74) *Attorney, Agent, or Firm* — Fishman Stewart PLLC

(57) ABSTRACT

A system and method for recommending computing resources for processing jobs in a distributed computing environment with multiple heterogeneous computing resources are disclosed. Training applications or jobs are executed and measured on different computing resources and on different configurations of the computing resources to establish a database of performance metrics. A matrix of application features and computing resource features is created and populated with performance data. Machine learning may be used to create and update multiple recommendation engines based on the matrix that are cross-validated and merged to form final performance estimators. The performance estimators are applied to new applications and determine which existing applications are most similar and which resources to recommend.

21 Claims, 8 Drawing Sheets

(56)        References Cited

U.S. PATENT DOCUMENTS

| 2018/0365576 | A1 |   | 12/2018 | Guttmann |
|---|---|---|---|---|
| 2019/0123973 | A1 | * | 4/2019 | Jeuk ....................... G06N 20/00 |
| 2019/0171483 | A1 |   | 6/2019 | Santhar |
| 2019/0208009 | A1 |   | 7/2019 | Prabhakaran |
| 2021/0124614 | A1 | * | 4/2021 | Gupta ................ G06F 11/3409 |

OTHER PUBLICATIONS

Prekopesak et al., Cross-validation: the illusion of reliable performance estimation, Budapest University of Technology and Economics, May 2012, 6 pages. (Year: 2012).*
International Search Report and Written Opinion dated Oct. 22, 2021 for International Patent Application No. PCT/US2021/042439.

* cited by examiner

FIG. 2

| App behaviour on system | Computing system 130A | Computing system 130B | Computing system 120 | Cloud provider 110A | Cloud provider 110B | Cloud provider 110C |
|---|---|---|---|---|---|---|
| App 1 | ★★☆ | ? | ☆ | ★★☆ | ★★☆ | ? |
| App 2 | ★☆ | ? | ★★★☆ | ★★☆ | ? | ★★★☆ |
| App 3 | ? | ★★★☆ | ? | ? | ? | ★☆ |
| App 4 | ★★☆ | ? | ★☆ | ? | ★★★☆ | ? |

Features Comp. 1 — 182A
Features Comp. 2 — 182B
Features Comp. 3 — 182C
Features Cloud 1 — 182D
Features Cloud 2 — 182E
Features Cloud 3 — 182F Features App 1 — 184A
Features App 2 — 184B
Features App 3 — 184C
Features App 4 — 184D Computing system features App features 180
194
188
192
186

FIG. 6

SYSTEM AND METHOD FOR RECOMMENDING COMPUTING RESOURCES

CROSS-REFERENCE TO RELATED APPLICATIONS

This application is a National Stage Patent Application of International Patent Application No. PCT/US2021/042439, filed Jul. 20, 2021, which claims the benefit of and priority to, U.S. Provisional Application Ser. No. 63/054,458, filed Jul. 21, 2020, titled "SYSTEM AND METHOD FOR REC-OMMENDING COMPUTING RESOURCES," the disclo-sures of which are hereby incorporated by reference in their entireties and for all purposes.

TECHNICAL FIELD

The present disclosure generally relates to the field of computing and, more particularly, to systems and methods for recommending resources in distributed computing envi-ronments.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Computationally intensive computing tasks such as machine learning (ML), artificial intelligence (AI), data mining, and scientific modeling typically require large amounts of computing resources, including storage, memory, and computing power. As the time required for a single system or processor to complete many of these tasks would be too great, they are typically split up and distributed to large numbers of processors (e.g., CPUs or GPUs) that work in parallel to complete the task more quickly. Special-ized computing systems having large numbers of processors that work in parallel have been designed to aid in completing these tasks more quickly and efficiently.

Unfortunately, these specialized computing systems are often expensive and may require significant expertise to configure and operate. A customer may not have enough budget or enough data intensive computing tasks to warrant the purchase of a system large enough to complete these tasks in the desired time frame. Furthermore, customers may not want to devote the personnel required to manage and maintain these large numbers of computing systems, and the type of computing tasks ("jobs") may vary over time as business needs change.

Cloud computing vendors have evolved to service the needs of customers like these. These cloud computing vendors offer customers access to large numbers of systems with different processing, memory and storage configura-tions to address individual customer needs. Similar to select-ing a rental car based on the number of passengers and luggage, cloud computing customers are now able to select different system configurations with different numbers of processors, storage, and memory for different compute tasks. These configurations can be selected on a per-task/job basis, or on a time basis (e.g., per-minute/hour/day/month). Furthermore, customers can select access to be provided on a dedicated basis (i.e., guaranteeing availability of the selected configuration), or an as-needed basis (i.e., offering the best match of existing resources that are currently available). Some systems even offer customers the ability to select from multiple competing cloud computing vendors, each with different system configurations.

Managing resources in a cloud computing environment can be difficult. As different jobs are submitted for process-ing by customers, those customers may be unfamiliar with the different configurations available and may need recom-mendations as to how time and cost effective the different available system configurations are for their jobs. For example, they may need estimates relating to which con-figuration provides the best performance, the lowest price, or the best value relative to performance per price.

Relative performance estimation of jobs on multiple sys-tems is difficult due to the large number of variables involved. Methods for performance estimation have typi-cally required hands-on expert analysis and in-depth knowl-edge of specific features of the job's software. These are not always easily available to cloud computing providers. For example, customers may not want to disclose the details of their source code, and cost considerations may prevent hands-on analysis.

For at least these reasons, there is a desire for improved systems and method for recommending computing resources.

SUMMARY

A system and method for automatically recommending computing resources using performance gathered from prior job executions using machine learning is contemplated. A matrix of performance data is created and at least partially populated by performance data generated by running appli-cations on a variety of different computing systems configu-rations (e.g., by allocating different numbers of CPUs/GPUs and memory). Performance data may comprise for example the percentage of time the application spends bound by different performance limitations, e.g., CPU, GPU, memory bandwidth/latency, network bandwidth/latency, etc. The matrix can be used to create/update a recommender that can recommend system configurations for new applications based on the historical data in the matrix for similar appli-cations. A similar application may be determined for example by characterizing the application's utilization of system computing resources when executing (e.g. a test run) on a given hardware system. The matrix can be updated with new performance data as new application/system combina-tions are profiled. Over time, the recommender can also be updated as well based on the changes to the matrix.

In one embodiment, the method comprises gathering performance data by running a plurality of training comput-ing jobs on a plurality of different computing devices in the distributed computing system. The performance data may be stored (e.g., in a database), and feature extraction may be performed on the gathered performance data. A matrix of job features and system features may be created and populated with data from running different jobs on different computing systems devices and configurations. One or more recom-mendation algorithms may operate on the matrix to generate estimates that are cross validated to identify the best esti-mates which are then used for a recommender to recommend computing resources (including configurations of thereof) for new similar computing jobs. Data from these new similar computing jobs may also be captured and fed back into the matrix. The performance data may be aggregated by job, app, queue, and app-queue and may include data such as execution time, instructions per second, memory usage, inter-process communication, network usage. The performance data may for example comprise instruction per second metrics, time to execute metrics. Data from similar queues may be used to provide data for queues where insufficient performance data exists in the database. The recommender may be based on one or more different recommendation algorithms, for example, K-nearest neighbors (KNN), content-based algorithms, or collaborative filtering using different feature sets and different performance metrics. The performance data may for example comprises job parameters such as measures of CPU boundness, GPU boundness, MPI (Message Passing Interface) boundness, memory boundness, and network boundness. The performance data may also comprise latency and bandwidth data. Job features may for example include libraries used, datasets used, application domain, and application metadata. The system features may for example comprise whether the system is virtualized or bare-metal, the number of cores, the type of cores, the available memory, and the maximum core clock speed, storage size/type, interconnect/network type, IO throughput, memory bandwidth and latency, network bandwidth and latency, and benchmark scores. A matrix factorization may be applied to the matrix of job features and system features, e.g., using Singular Value Decomposition (SVD).

In another embodiment, the method may comprise gathering performance data by running a plurality of test jobs on a plurality of different subsets of the computing resources in the computing system and analyzing the gathered performance data to create aggregated performance values. These may be populated into a matrix that is used to create a recommender. When a new job is received, it may be characterized to determine which of the test jobs is most similar based on resource utilization; and then the recommender may select an optimal subset of the computing resources to execute the new job based on the aggregated performance values for the most similar test job. If the new job shows intensive utilization of a specific type of computing resource, then the recommender may select a subset of system/computing resources that comprises more of the specific type of computing resource that will be intensively utilized. Examples of these resources may include nodes, queues, cores, threads, memory bandwidth, and network bandwidth. If the new job's performance on a first system characterizes similarly to one of the test job's performance on the first system, then the recommender may use the test job's performance on a second system to estimate the performance of the new job on the second system. If the new job's performance on a first system characterizes similarly to the new job's measured performance on a second system, then the recommender uses the new job's performance on the second system to estimate the performance of the new job on the first system. The new job may be executed, and new performance data may be gathered for it and used to create new aggregated performance values. These may be used to update the matrix and in turn update the recommender.

In one embodiment a system of finding computing resource utilization patterns and characterizing an application (finding its features/attributes) is based on statistical modeling of performance data that has been derived from running a large number of applications on a large number of computing systems. The system may recommend computing resources in a distributed computing system (e.g., high performance computing "HPC" system). The system may comprise a plurality of nonhomogeneous computing devices with varying processor and memory configurations and a management application (e.g. stored on a computer-readable medium such as a hard drive or SSD and executed on a master/management server connected to the plurality of computing devices via a network). The management application may be configured to gather performance data by running a plurality of training computing jobs on the plurality of computing devices in the distributed computing system and store that data in a database. The application may then perform feature extraction on the gathered performance data and create a matrix of job features and system features. A set of recommendation algorithms may then be executed to generate performance estimates, which may in turn be cross validated to identify the best estimates that may be used to recommend computing resources for new computing jobs.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIG. 2 is an example of one embodiment of a recommendation matrix.

FIG. 6 is another illustration of jobs executing on different computing devices.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Figure 1:
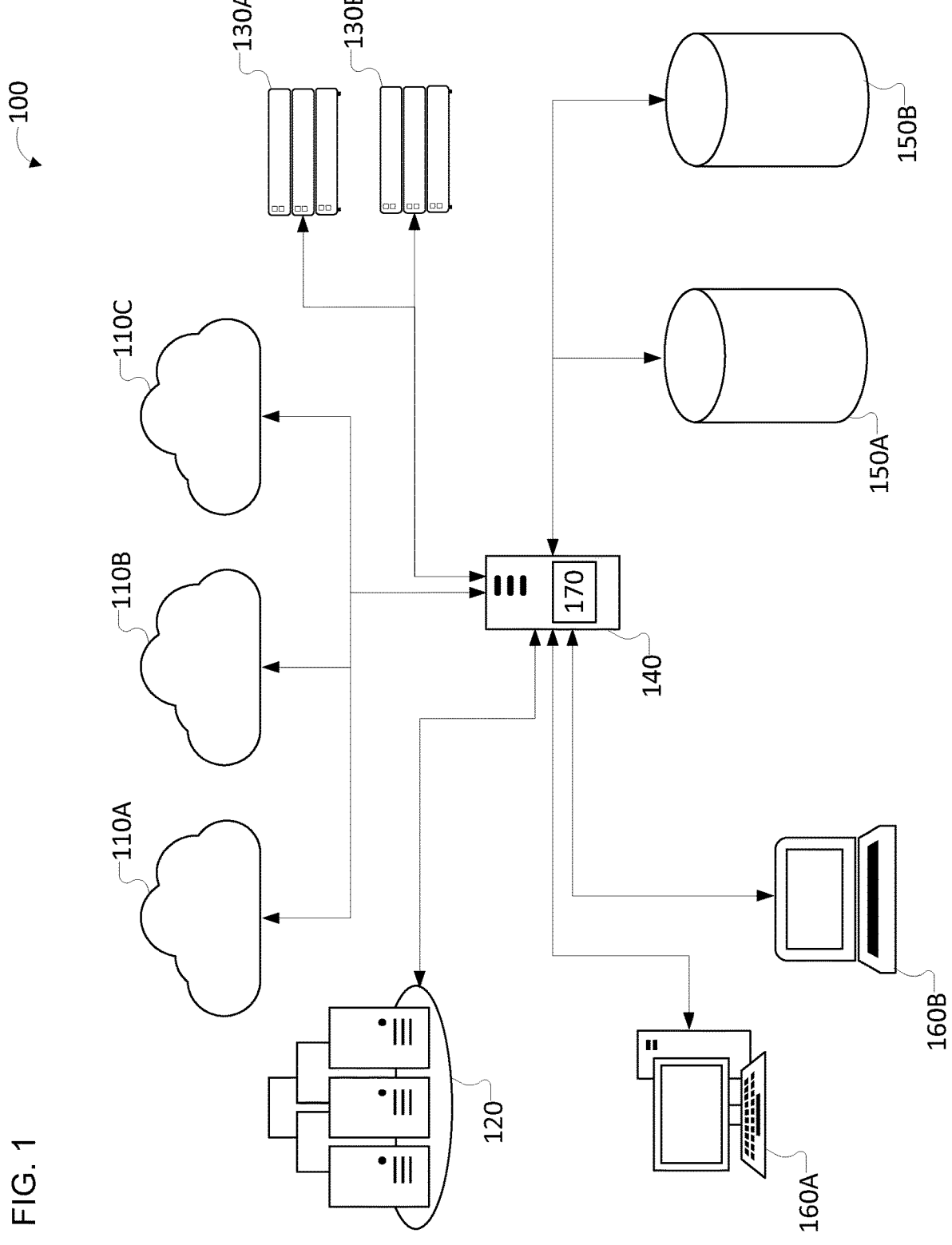
FIG. 1 is a diagram of one example of a distributed computing system with multiple computing devices and cloud computing providers.

Turning now to FIG. 1, an example of a distributed computing system 100 is shown. In this example, the distributed computing system 100 is managed by platform as a service (PAAS) management server 140. Management server 140 is connected to a number of different computing devices via local or wide area network connections. This may include, for example, cloud computing providers 110A, 110B, and 110C. These cloud computing providers may provide access to large numbers of computing devices (often virtualized) with different configurations. For example, systems with a one or more virtual CPUs may be offered in standard configurations with predetermined amounts of accompanying memory and storage. In addition to cloud computing providers 110A, 110B, and 110C, management server 140 may also be configured to communicate with bare metal computing devices 130A and 130B (e.g., non-virtualized servers), as well as remote datacenter 120, and storage systems 158 and 150 B. Bare metal computing devices 130 A and 130 B may for example include workstations or servers optimized for machine learning computations and may be configured with multiple CPUs and GPUs and large amounts of memory. Storage systems 158 and 150 B may include storage that is local to management server 140 as well as remotely located storage accessible through a network such as the internet. Storage systems 158 and 150 B may comprise storage servers and network-attached storage systems with non-volatile memory (e.g., flash storage), hard disks, and even tape storage.

Management server 140 is configured to run a distributed computing management application 170 that receives jobs and manages the allocation of resources from distributed computing system 100 to run them.

Management application 170 is preferably implemented in software (e.g., instructions stored on a non-volatile storage medium such as a hard disk, flash drive, or DVD-ROM), but hardware implementations are possible. Software implementations of management application 170 may be written in one or more programming languages or combinations thereof, including low-level or high-level languages, with examples including Java, Ruby, JavaScript, Python, C, C++, C#, or Rust. The program code may execute entirely on the server 140, partly on server 140 and partly on other computing devices in distributed computing system 100, including for example partly on the user's computer or devices 160A and 160B.

The management application 170 provides an interface to users (e.g., via a web application or portal) that permits users to submit jobs via their workstations 160A, laptops 160B, and mobile devices, designate the data sources used in the jobs, and optionally select from an array of choices presented by management application 170 as to which of the available computing resources within system 100 should to be used to execute the jobs. Parameters presented to the user in connection with the array of choices may, for example, include the estimated time to complete the proposed job on the particular set of resources and the cost of utilizing those resources. Note the terms jobs and applications are used interchangeably herein, and both refer to computing tasks submitted by users for execution by the distributed computing system 100.

Management application 170 may include a user interface module configured to communicate with the user (e.g., the user of desktop PC 160A or mobile device 160B). Management server 140 may be a traditional PC or server, or specialized appliance. Management server 140 may be configured with one or more processors, volatile memory, and non-volatile memory such as flash storage or internal or external hard disk (e.g., network attached storage accessible to server 140).

Management application 170 may also be configured to make recommendations to the user regarding which available computing resources are likely to offer (1) the cheapest execution, (2) the fastest execution, or (3) the best deal in terms of price per performance. Management application 170 may be configured to determine which computing resources are appropriate for a given application. Appropriate relates to computing resource utilization patterns yielding a better (e.g., optimal, more optimal, best fit, best match) run-time. The management application 170 may be configured to find similarities in applications' utilization of computing resources in a particular computing system configuration (e.g., same hardware).

In one embodiment, management application 170 may be configured to use machine learning (ML) in order to determine which available system resources should be recommended for a particular job. This ML solution advantageously has the ability to improve over time and create recommendations in a dynamic environment such as distributed computing system 110 where availability changes rapidly over time as different computing resources are reserved for jobs and new resources are added (e.g., new types of hardware become available) and removed (e.g., systems go offline for maintenance). Management application 170 may generate recommendations in its ML algorithms according to a number of different techniques, such as content-based recommendation, collaborative filtering-based recommendations, and hybrid recommendations combining content-based and collaborative filtering-based recommendations.

Content-based recommendation systems recommend products based on similarities between the products or features. For example, if a customer purchases a blue cotton dress from an online store, the store's recommendation engine may recommend a different red dress based on their similar cut, or a pair of matching blue shoes based on their similar color. Collaborative filtering recommendation systems recommend products based on users' observed behavior or purchasing patterns. For example, if a first customer is observed purchasing a blue cotton dress and a pair of red shoes at the same time from an online store, the store's recommendation engine may recommend the same red shoes to the next customer that puts the blue cotton dress into their shopping cart based on the prior purchase history of the earlier customer.

Management application 170 may offer users recommendations based on estimates of the relative performance of a job on different computing resources selected from those available in distributed computing system 100 based on a combination of content-based and collaborative filtering. Going back to the earlier online clothing store example, one could think of computing jobs as the customers, available computing system resources as the products, and historical job performance data as the purchase history.

As described in greater detail below, management application 170 may profile both the computing systems (e.g., by running benchmarks) and applications (e.g., by monitoring their performance when executing on the computing systems). This data may be aggregated and stored into a matrix. The matrix can for example include data from experiments or test runs for different application features on known hardware configurations.

Based on the collection of large amounts of this accumulated performance data in the matrix, in some embodiments a predictor function can be created/updated that maps new application performance on a given system to a similar application's performance for which prior performance data is known (e.g., a prior customer application run or earlier test/experiment application run). This predictor function can be a relative predictor or absolute predictor.

In some embodiments a classifier may be used to classify new applications based on selected attributes. This might include for example what classes are used by the application, whether the application I/O intensive or network intensive, whether the application involves heavy matrix-multiplication, finite element analysis, gradient decent algorithms, etc.

These can be used to recommend particular computing systems or computing system configurations for existing and new applications. For example, if a similar application has been profiled on a computing system and has been determined to be mostly network-bound once more than 1 CPU and 4 GPUs are allocated, then management application 170 may be configured to recommend that optimal configuration for a new application that is similar to the previously profiled application. This would beneficially save the customer money without significantly increasing execution time while also allowing the remaining CPU and GPUs in the system to be used by another customer (resulting in more revenue for the distributed computing system operator).

Turning now to FIG. 2, an example of one embodiment of a recommendation matrix 180 is shown. In some embodiments management application 170 may utilize a recommendation matrix to generate computing resource recommendations for computing jobs submitted by users. In this example, the recommendation matrix 180 comprises recommendations, i.e., relative performance estimates (represented by the stars) for combinations of applications (each having certain application features 184A-184D) executed on computing resources (each having computing resource features 182A-182F). For example, an application 186 may have executed with relatively high performance (represented by four-star entry 192) on computing system 130A, which has features 182A (e.g., 2 CPUs operating at 3.0 GHz, 8 GPUs operating at 1.5 GHz, and 64 GB of memory), but with lower relative performance (represented by two-star entry 194). Note that while stars are used in the figure, more precise numerical values can be used in the recommendation matrix 180 implemented by management application 170. Some combinations of applications may not necessarily be executed on all different computing resources in distributed system 100. In the example, application 186 has not be executed on computer system 130B or cloud providers 110A and 110C.

In order to provide recommendations for combinations that have not been executed and measured, management application 170 may perform content-based filtering to generate missing recommendations based on prior recommendations of applications with similar application features executing on computing systems with similar hardware features.

Figure 3:
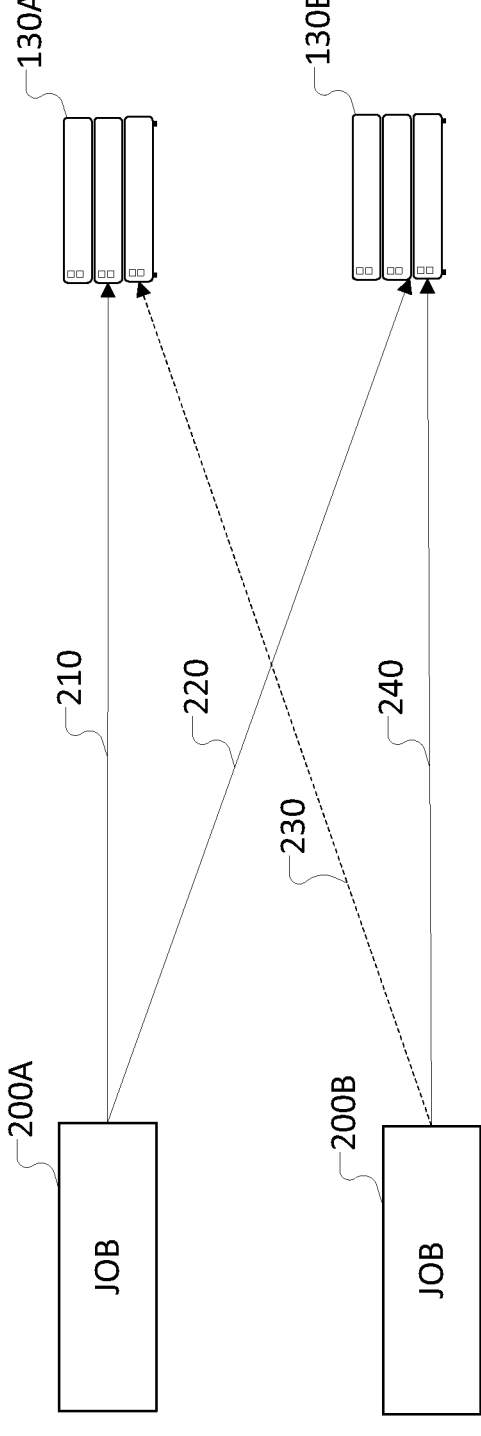
FIG. 3 is an illustration of a job executing on different computing devices.

Turning now to FIG. 3, one such example is shown, where job 200A has been executed and measured on computing systems 130A and 130B. This execution is represented by arrows 210 and 220. In this example, computing systems 130A and 130B have different but similar hardware features (e.g., same number of cores and core operating frequencies, same amount of memory, and same type of network interfaces). Job 200B is different than job 200A, but has similar application features (e.g. the libraries called by the job). Job 200B has been executed and measured on computing system 130B (as represented by arrow 240), but it has not been executed on computing system 130A. Management application 170 may estimate the relative performance of executing job 200B on computing system 130A (as represented by dashed arrow 230) based on job 200A and job 200B being similar and having had similar performance metrics 220 and 240 when executing on system 130B (which is similar to system 130A).

Figure 4:
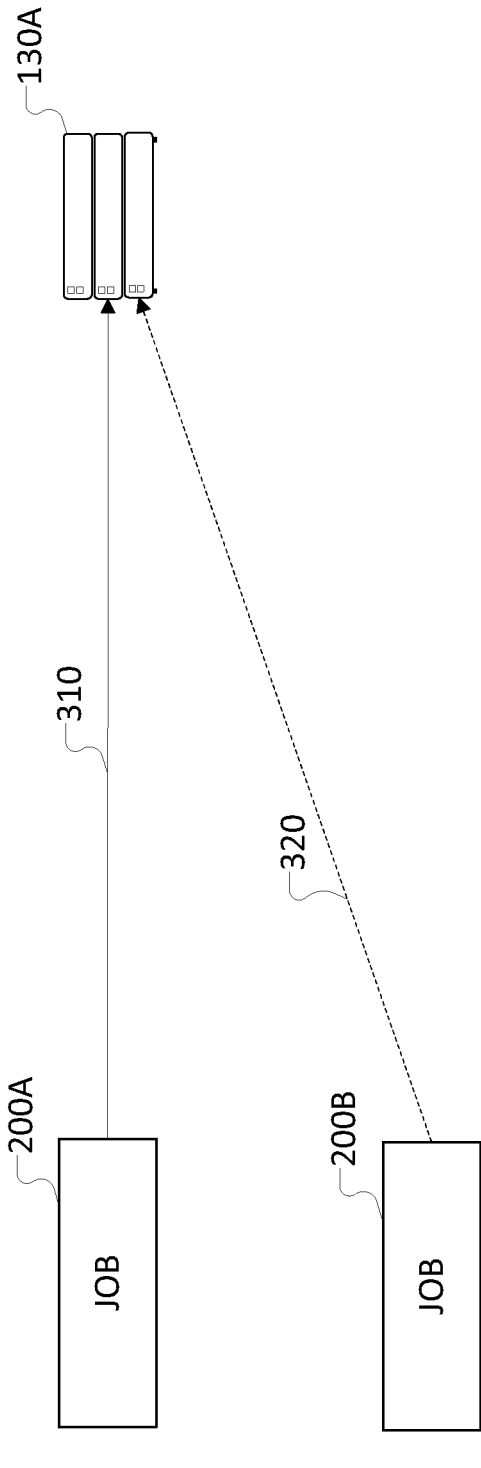
FIG. 4 is an illustration of a job executing on a computing device.

Turning now to FIG. 4, in this example job 200B has not been executed on computing system 130A, but similar job 200A has been executed with measured performance metrics. Management application 170 may estimate the relative performance of job 200B on computing system 130A based on the measured performance of job 200A executed by computing system 130A.

Figure 5:
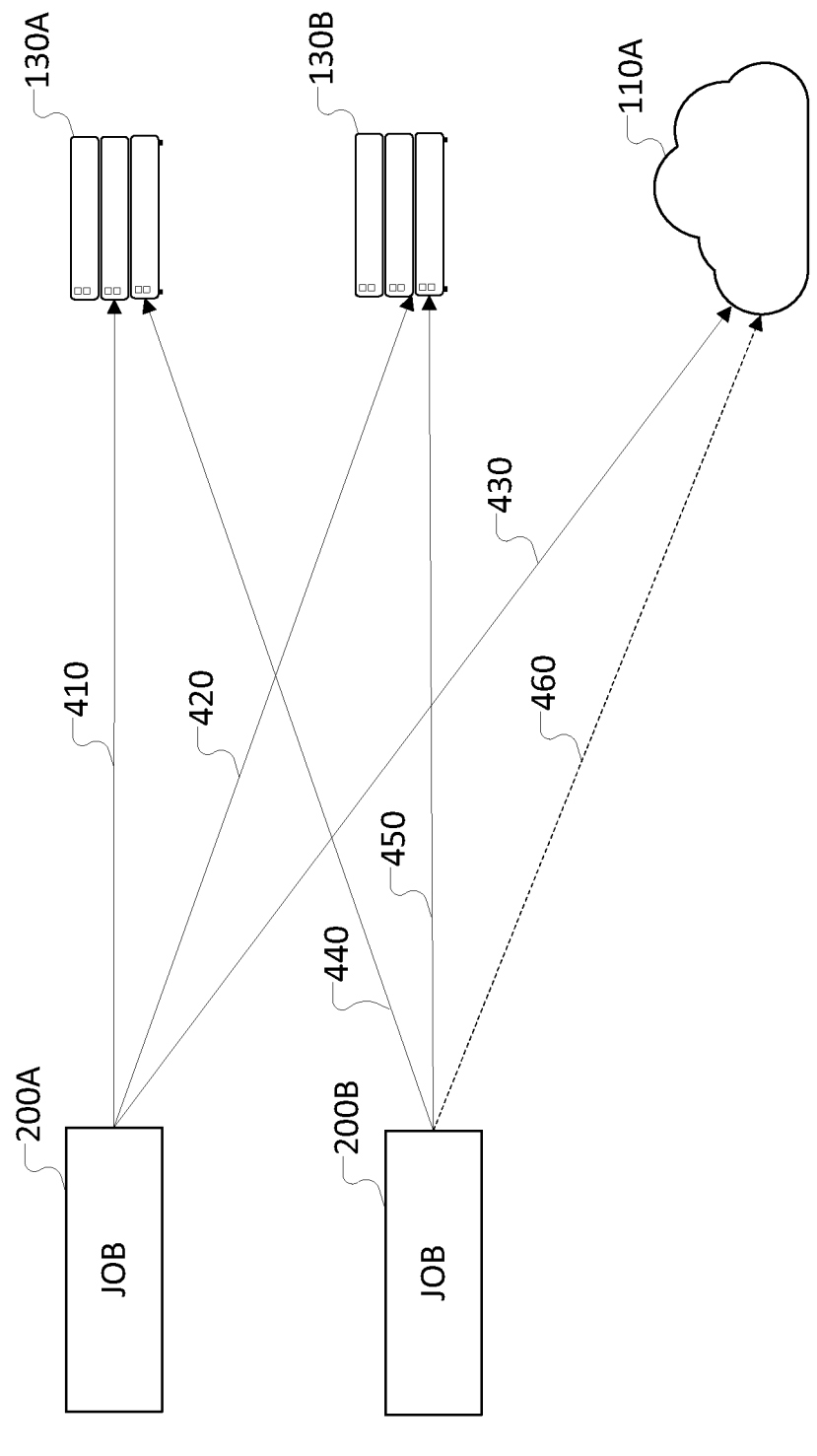
FIG. 5 is an illustration of jobs executing on different computing devices.

Turning now to FIG. 5, in this example jobs 200A and 200B with similar job features have been executed and measured on computing systems 130A and 130B (represented by arrows 410, 420, 440, and 450). Job 200A has also been executed and measured on cloud provider 110A (represented by arrow 430), but job 200B has not. Management application 170 may be configured to estimate the relative performance of job 200B on cloud provider 110A (represented by dashed arrow 460) based on the measured performance of job 200A on cloud provider 110A.

Figure 6:
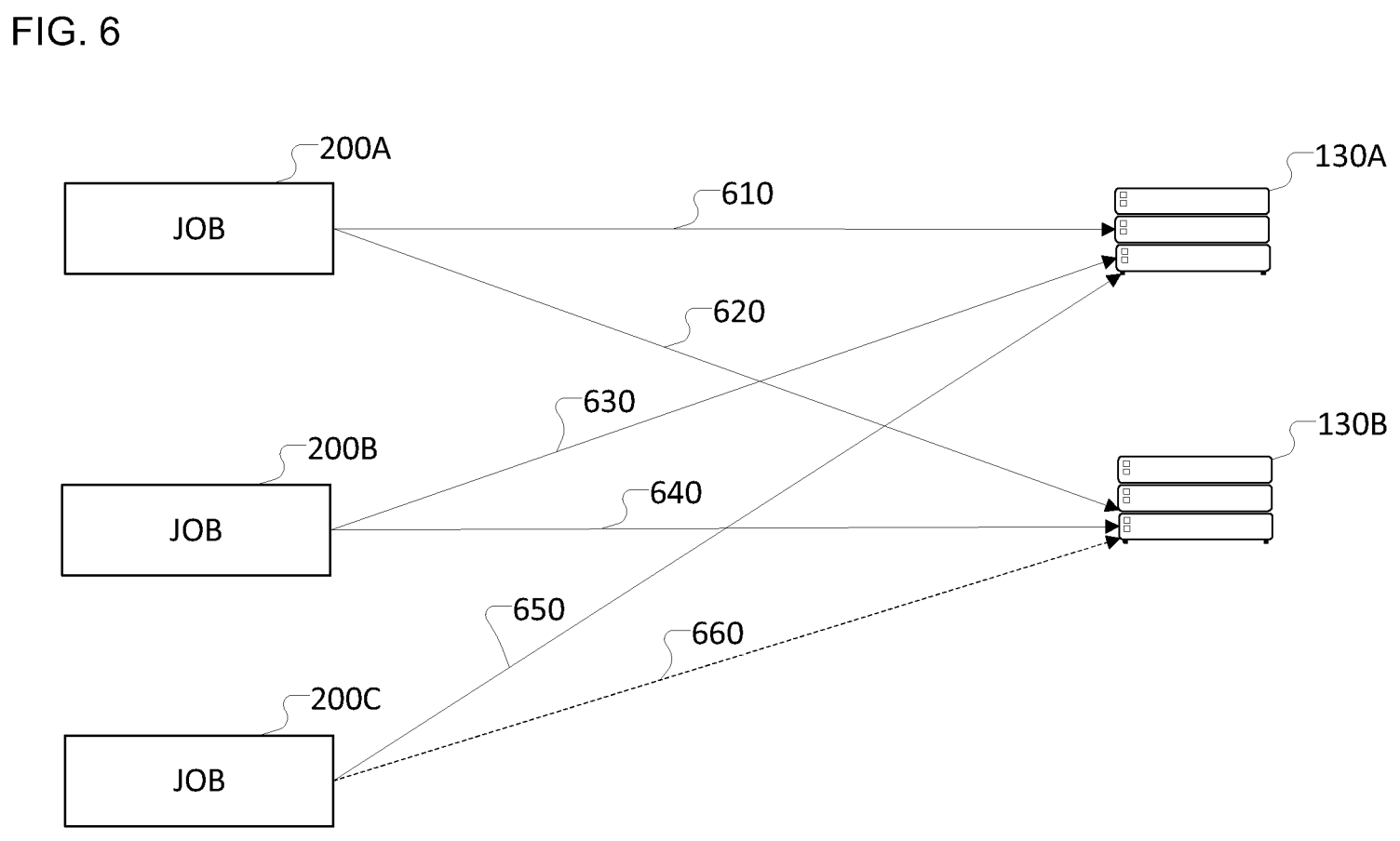

Turning now to FIG. 6, in this example jobs 200A, 200B, and 200C have been executed and measured on computing systems 130A (represented by arrows 610, 630, and 650) and jobs 200A and 200B have also been executed and measured on computing system 130B (represented by arrows 620, and 640). Job 200C has not been executed and measured on computing system 130B (represented by dashed arrow 660). Management application 170 may be configured to estimate the relative performance of job 200C on computing system 130B based on the relative performance of jobs 200A and 200B on computing system 130A and computing systems 130B if those computing systems share relevant computing system features.

In some embodiments, management application 170 may collect data for training its machine learning algorithm by submitting jobs to the different resources in distributed computing system 110 and measuring their performance. Measured performance metrics may for example include instructions per second, MPI times, and time to completion. Cloud to bare-metal correlation may be calculated, and in addition, automatic feature extraction may be performed, e.g., using singular value decomposition (SVD) or deep learning.

Management application 170 may also collect feature information about the jobs that are processed by distributed computing system 100. This may, for example, include data regarding whether the job is CPU bound, message passing interface (MPI) bound, IO bound, or not bound (e.g., spending time in an idle state).

Additional information collected by management application 170 may include hardware feature information of the computing systems in distributed computing system 100, for example, the number of CPU and/or GPU cores in each system, the type of cores, the available memory, the maximum clock speed, the system architecture, the network type/speed, and the storage type/speed. Management application 170 may also be configured with specific performance data for the computing systems in distributed computing system 100, for example, Linpack benchmark scores, memory bandwidth and latency, network bandwidth and latency, and IO throughput. This data may also be processed using automatic feature extraction techniques, e.g., using singular value decomposition (SVD) or deep learning. The processed data may then be used by management application 180 to train its machine learning engine.

Figure 7:
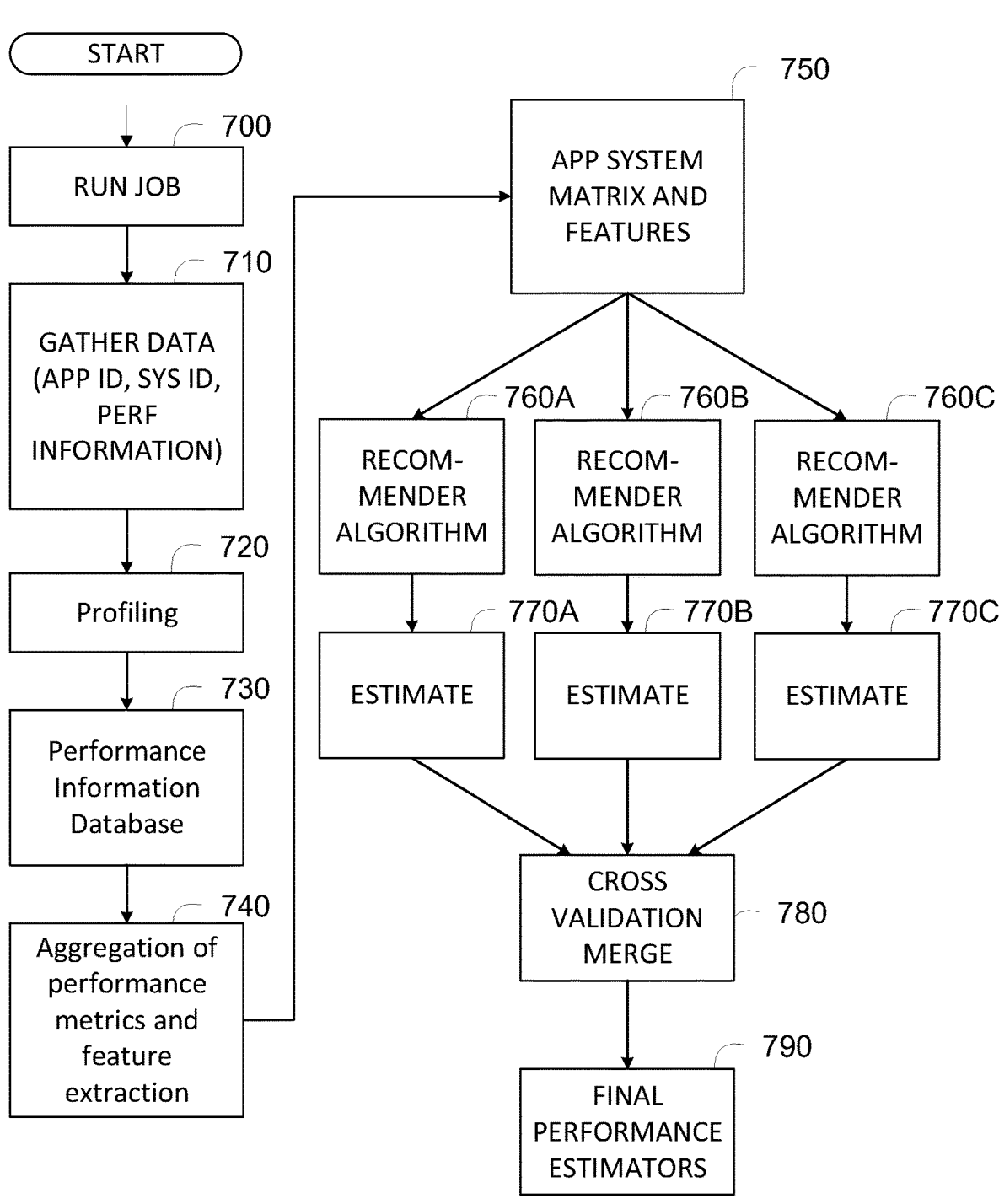
FIG. 7 is a flow chart of an example embodiment of a method for recommending computing resources and configurations for computing jobs in a computing system.

Turning now to FIG. 7, a flowchart is shown illustrating one embodiment of a method usable by management application 170 for recommending computing resources in a distributed computing system such as system 100 using machine learning. For each job run (step 700), data about the job is collected (step 710). This data may include for example the job's application ID, the system ID of the computing system executing the job, and performance metrics as described above. The job may also be profiled (step 720). For example, the libraries or data sets used by the job may be captured. The data is stored in a performance information database (step 730), the data is aggregated, and feature extraction is performed (step 740). A system matrix is then created/updated (step 750), and multiple recommender algorithms are run (steps 760A, 760B, 760C). Each algorithm generates one or more estimates (steps 770A, 770B, 770C), and cross-validation is performed (step 780) to merge the estimates and select the final best performance estimators (step 790).

Figure 8:
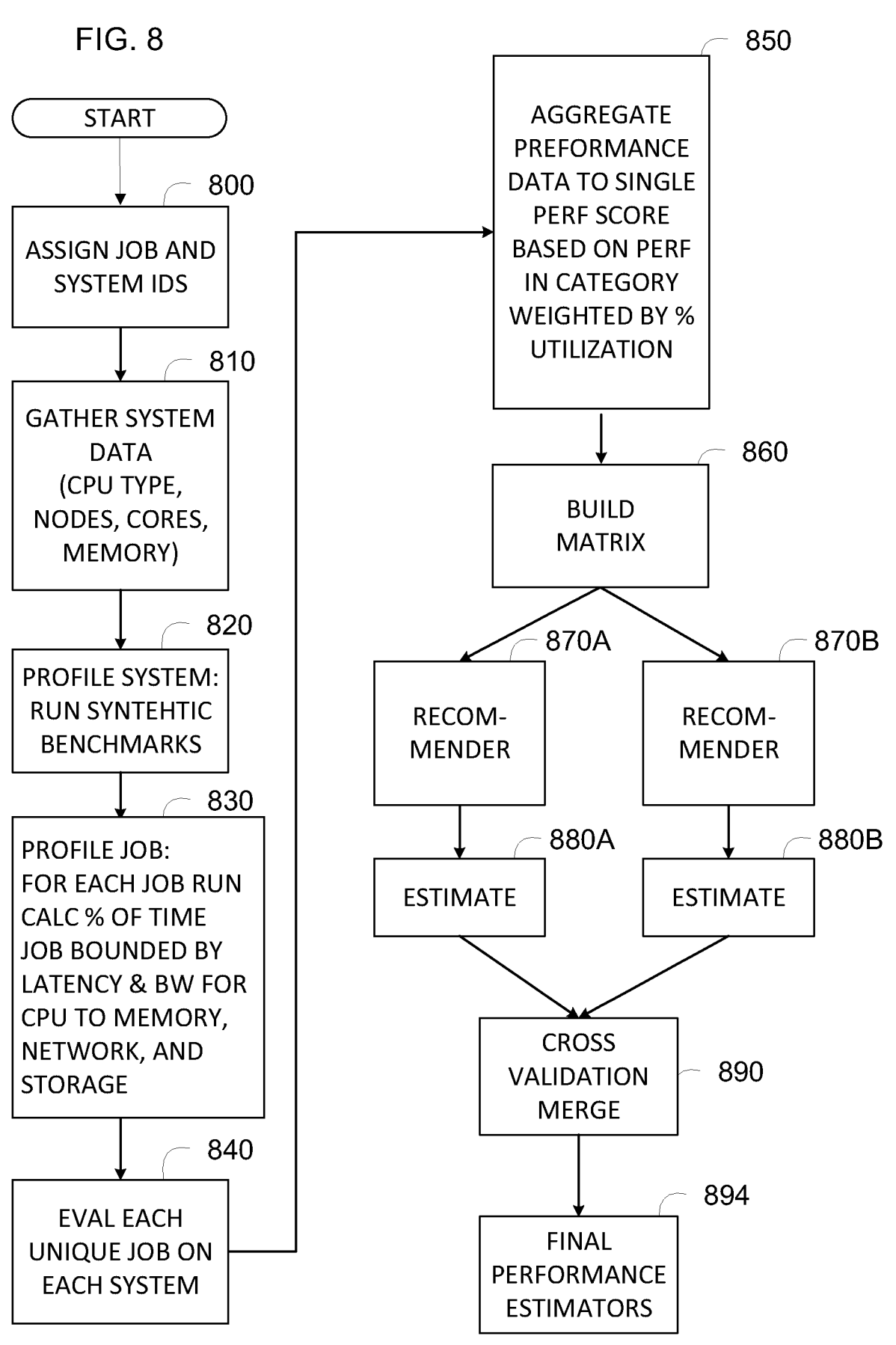
FIG. 8 is a flow chart of another example embodiment of a method for recommending computing resources and configurations.

Turning now to FIG. 8, another flowchart is shown illustrating another embodiment of a method usable by management application 170 for recommending computing resources in a distributed computing system such as system 100. In this embodiment, applications/jobs may be assigned IDs (e.g., by hashing the job or system configuration) to be able to uniquely identify them (step 800). For each system, information may be gathered (e.g., the CPUs type, GPU types, CPU quantity, GPU quantity, number of CPU cores, number of GPU cores, quantity of memory, busses and network types). Configuration files or tools such as the Portable Hardware Locality tool (hwloc) and Portable Network Locality tool (netloc) may be used to gather this information. The computing systems may then be profiled (step 820), for example by executing test jobs such as synthetic benchmarks (e.g. LINPACK benchmarks). Test jobs or prior production jobs run on the system may also be profiled (step 830). This profiling or characterization may be performed in a number of different ways. In one embodiment, the job run is characterized by calculating the percentage of time the job is bounded by one of the following: CPU bandwidth/latency, GPU bandwidth/latency, memory latency/bandwidth, network latency/bandwidth, and storage latency/bandwidth. The test jobs may be evaluated on each different computing system in the distributed computing system (step 840), or on different subsets of computing resources of computing systems in the distributed computing system. For example, a single computing device such as a high-performance compute cluster may have multiple nodes, with each node having multiple CPUs and GPUs. A job may be tested on a single CPU and GPU pair, on a single CPU with two GPUs, on a single CPU with four GPUs, on two CPUs each with two four GPUs, and so on.

In some embodiments, this potentially large quantity of performance data may be aggregated and combined into a single performance score. For example, several performance metrics may combined by weighting them based on resource utilization. For example, each performance metric may be weighted by the amount of time the job spends bound by that particular performance metric, and each performance metric may be calculated based on the percentage of resource utilization for the resource, e.g., CPU, memory-bandwidth, memory-latency, network-bandwidth, network-latency, storage-bandwidth and storage-latency. A performance value may be calculated for each category. For example, for CPU the measure of instructions per second may be used, and for storage bandwidth measured read/write throughput may be used. A final job performance value for the run may be calculated based on the performance on each category weighted by the percentage of utilization of the resource (e.g., instructions per second weighted by percentage of CPU utilization). For applications comprising multiple jobs/runs, overall application performance in one computing system can be calculated as the average of performance for all job runs. With this information, an application/job-computing system matrix (such as the example in FIG. 2) can be built (step 860), in which each element represents the performance of a particular job/application when executed on a particular computing system.

The matrix can be used by a recommender (e.g., using collaborative filtering or content-based recommendation). In some embodiments, several different recommenders can be used in parallel (steps 870A and 870B), each using a different type of algorithm, (e.g., linearly weighted performance prediction described above, collaborative filtering, and content-based). The estimates from the recommender(s) (steps 880A and 880B) can be combined using a weighted hybridization approach (e.g., linearly combine the estimates using weights for each algorithm result) (step 890), to generate a final performance estimate (step 894). The weighs for each algorithm can be automatically estimated in a cross-validation process with the available data in the system. The weights might be periodically re-estimated, e.g., in response to new data becoming available.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such elements. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." and "for example" in the specification is to be construed broadly and is used to provide non-limiting examples of embodiments of the disclosure, and the disclosure is not limited to such examples. Uses of "and" and "or" are to be construed broadly (e.g., to be treated as "and/or"). For example, and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method for recommending computing resources in a distributed computing system, the method comprising:
  (a) gathering performance data by running a plurality of training computing jobs on a plurality of different computing devices in the distributed computing system;
  (b) storing the performance data in a database;
  (c) performing feature extraction on the gathered performance data to identify job features of the training jobs and system features of the computing devices;
  (d) creating a matrix of the job features and the system features provided with the extracted performance data;
  (e) generate performance estimates using a plurality of recommendation algorithms;
  (f) cross validating the performance estimates to identify best estimates; and (g) recommend computing resources for a next computing job using the best estimates.

2. The method of claim 1, further comprising:
  executing a next computing job on the recommended computing resources; and
  repeating steps (a)-(f) using new performance data generated from the execution of the next computing job.

3. The method of claim 1, further comprising aggregating the performance data in the database by job, app, queue, and app-queue.

4. The method of claim 1, wherein the performance data comprises instruction per second metrics.

5. The method of claim 1, wherein one of the features is cloud versus bare metal.

6. The method of claim 1, further comprising using similar queues to provide data for queues where insufficient performance data exists in the database to perform steps (c)-(f).

7. The method of claim 1, wherein at least one of the plurality of recommendation algorithms is K-nearest neighbors (KNN).

8. The method of claim 1, wherein the plurality of recommendation algorithms comprises content-based algorithms and collaborative filtering using different feature sets and different performance metrics.

9. The method of claim 1, wherein the performance data comprises job parameters comprising measures of CPU boundness, GPU boundness, MPI boundness, memory boundness, and network boundness.

10. The method of claim 9, wherein the performance data further comprises latency and bandwidth.

11. The method of claim 1, wherein the job features comprise libraries used, datasets used, application domain, and application metadata.

12. The method of claim 1, wherein the system features comprise a number of cores, a core type, an available memory amount, and a maximum core clock speed.

13. The method of claim 1, wherein the system features comprise storage type and network type.

14. The method of claim 1, wherein the system features comprise IO throughput.

15. The method of claim 1, wherein the system features comprise memory bandwidth and latency.

16. The method of claim 1, wherein the system features comprise benchmark scores.

17. A system having at least one processor, the system configured to:
  gather performance data by running a plurality of training computing jobs on a plurality of different computing devices in a distributed computing system;
  store the performance data in a database;
  perform feature extraction on the gathered performance data to identify job features of the training jobs and system features of the computing devices;
  create a matrix of the job features and the system features provided with the extracted performance data;
  generate performance estimates based on a plurality of recommendation algorithms;
  cross-validate the performance estimates to identify best estimates; and
  recommend computing resources for a next computing job using the best estimates.

18. A system having at least one processor, the system configured to:
  analyze gathered performance data to create aggregated performance values, wherein the gathered performance data is obtained by running a plurality of test jobs on a plurality of different subsets of computing resources;

perform feature extraction on the aggregated performance values to identify job features of the test jobs and system features of the computing resources;

populate a matrix with the job features and the system features based on the aggregated performance values;

create a recommender using the matrix;

characterize a new job to determine which of the test jobs is most similar based on resource utilization; and select via the recommender an optimal subset of the computing resources to execute the new job based on the aggregated performance values for the most similar test job.

19. The system of claim 18, further configured to:

execute the new job;

gather new performance data for the new job;

create new aggregated performance values based on the gathered new performance data;

update the matrix with the new aggregated performance values; and update the recommender using the updated matrix.

20. The system of claim 18, further configured to select via the recommender a subset of system resources that comprises more of a specific type of computing resource in response to the new job showing intensive utilization of the specific type of computing resource.

21. The system of claim 18, wherein if the new job's performance on a first computing system characterizes similarly to one of the plurality of test job's performance on the first computing system, then the recommender uses the test job's performance on a second computing system to estimate a performance of the new job on the second computing system.

* * * * *